United States Patent
Barrier et al.

(10) Patent No.: US 6,170,782 B1
(45) Date of Patent: Jan. 9, 2001

(54) RESILIENT SUPPORTS

(75) Inventors: Gonzague Barrier, Fay-de-Bretagne; Pascal Chanteux; Luc Pecot, both of Nantes, all of (FR)

(73) Assignee: Draftex Industries Limited, Edinburgh (GB)

( * ) Notice: Under 35 U.S.C. 154(b), the term of this patent shall be extended for 0 days.

(21) Appl. No.: 09/202,530

(22) PCT Filed: Mar. 18, 1997

(86) PCT No.: PCT/GB97/00740

§ 371 Date: Feb. 25, 1999

§ 102(e) Date: Feb. 25, 1999

(87) PCT Pub. No.: WO98/00661

PCT Pub. Date: Jan. 8, 1998

(30) Foreign Application Priority Data

Jul. 2, 1996 (GB) .................................................. 9613830

(51) Int. Cl.$^7$ ...................................................... E21F 17/02
(52) U.S. Cl. ........................... 248/60; 248/638; 248/636; 267/152; 267/153
(58) Field of Search ............................ 248/60, 638, 636, 248/632, 644; 267/152, 153; 180/309; 52/167.7

(56) References Cited

U.S. PATENT DOCUMENTS

| | | | |
|---|---|---|---|
| 3,161,252 | * 12/1964 | Brown | 108/89.2 |
| 3,204,901 | * 9/1965 | Dunn | 248/74.3 |
| 3,270,992 | * 9/1966 | Cassel | 248/60 |
| 3,289,984 | * 12/1966 | Clemons et al. | 248/60 |
| 4,019,599 | * 4/1977 | Strunk | 180/296 |
| 4,116,411 | * 9/1978 | Masuda | 248/60 |
| 4,380,324 | 4/1983 | Woesler | 248/610 |
| 4,415,391 | * 11/1983 | Reid | 156/187 |
| 4,727,957 | 3/1988 | Fujita | 181/208 |
| 4,781,365 | * 11/1988 | Harrison | 267/294 |
| 5,082,252 | * 1/1992 | Miyamoto | 267/140.13 |
| 5,102,107 | * 4/1992 | Simon et al. | 267/152 |
| 5,271,595 | * 12/1993 | Simon et al. | 248/632 |
| 5,398,907 | * 3/1995 | Kelchner | 248/634 |
| 5,957,441 | * 9/1999 | Tews | 267/153 |

FOREIGN PATENT DOCUMENTS 0 509 819   10/1992   (EP) .

* cited by examiner

Primary Examiner—Anita M. King
Assistant Examiner—Naschica Sanders
(74) Attorney, Agent, or Firm—Leydig, Voit & Mayer, Ltd.

(57) ABSTRACT

A resilient support (10), such as for supporting part of the exhaust system of a motor vehicle, is molded from elastomeric material such as rubber. Upper and lower end blocks (16, 18) have through bores (12, 14) for receiving fixtures connected respectively to the body of the vehicle and to the exhaust system. The blocks (16, 18) are interconnected by three integral diagonally directed arms (22, 24, 26). Vertical vibration of the exhaust system is resisted, absorbed and damped by a combination of tension in the arms (22, 24, 26) and bending at their points of interconnection with the upper and lower blocks (16, 18). The support (10) is thus relatively resilient in this direction. However, sideways movement of the exhaust system, tending to cause movement of the lower block (18) in the direction of the axis of the lower bore (14), is firmly resisted by the arms (22, 24, 26). Such sideways movement in one direction is resisted by tensile forces in the central arm (22) and a combination of compressive and bending forces in the outer arms (24, 26), and sideways movement in the opposite direction is resisted by tensile forces in the outer arms (24, 26) and a combination of compressive and bending forces in the central arm (22).

6 Claims, 2 Drawing Sheets

RESILIENT SUPPORTS

The invention relates to a resilient support for resiliently supporting a vibratable member from a relatively rigid structure, comprising a first end part having a front face and a rear face and being adapted for connection to the structure, and a second end part having a front face and a rear face and being adapted for connection to the vibratable member, and arm means resiliently connecting the first and second end parts together such that vibration of the member relative to the structure tends to move the first and second end parts away from and towards each other, the arm means comprising at least a first arm made of resilient material connected to the first and second end parts for resiliently resisting the vibrations.

Such a support is known, for example from EP-A-0 411 246. The known support is usable for supporting part of the exhaust system of a motor vehicle. Such a support resists the vibrations of the exhaust system relative to the supporting structure of the vehicle. It is desirable, though, to arrange for such a support to have resistance also to forces acting in a sideways direction. The invention aims to deal with this problem.

According to the invention, therefore, the known support is characterized in that the first and second end parts face in opposite directions and the first arm is resiliently connected to the end parts and extends between corresponding faces of the end parts in a direction diagonal to the vibration directions whereby vibrations are resisted by tension and compression in the arm and by bending where the arm is resiliently connected to the end parts and whereby movement of the vibratable member relative to the structure in directions transverse to the vibration directions is resisted in one of those transverse directions substantially by tension in the arm and in the other of the transverse directions by a combination of compression in the arm and bending therein.

Resilient supports embodying the invention, and for supporting an exhaust pipe in a motor vehicle, will now be described, by way of example only, with reference to the accompanying diagrammatic drawing in which.

Figure 1:
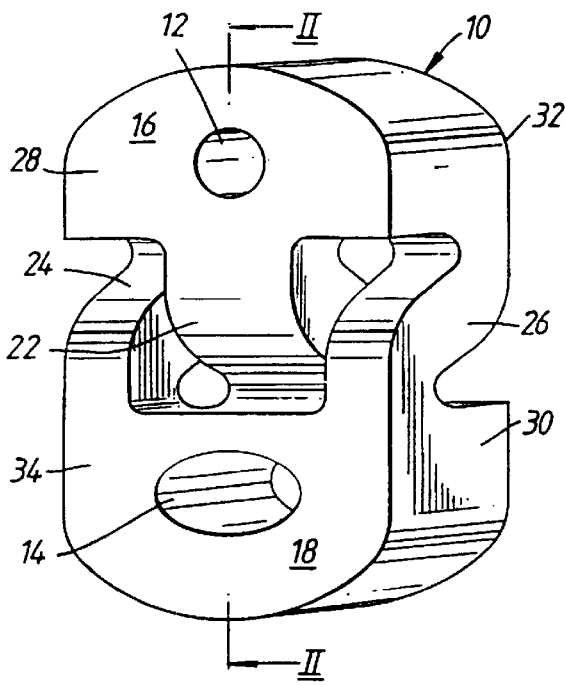
FIG. 1 is a perspective view of one form of the resilient support is a section on the line II—II of FIG. 1.

The resilient support 10 of FIG. 1 is for resiliently supporting or suspending part of the exhaust system, such as an exhaust pipe, of a motor vehicle, from the body or chassis of the vehicle. The support 10 is made of elastomeric material such as rubber or other strong resilient material and is preferably made by a molding process. The rubber is molded to provide two through holes 12 and 14 for receiving stiff metal attachment hooks. Thus, a first metal hook passes through the bore 12 and is attached, above the support 10, to a fixed point on the body or chassis of the vehicle. A second stiff metal hook passes through the bore 14 and extends below the support 10 into attachment to the exhaust pipe. The bore 12 in this example is circular in cross-section, while the bore 14 is oval. Of course, other shapes may be used instead.

The support 10 comprises upper and lower end blocks 16 and 18 which are integrally connected together by three arms, that is, an inner arm 22 and two outer arms 24 and 26. The upper and lower blocks 16,18 are of generally the same external shape except that they face in opposite directions. As is apparent from FIG. 2, the inner arm 22 extends from the front face 28 of the upper block 16 to the corresponding face 30 of the lower block 18. In contrast, the two outer arms 24,26 extend from the rear face 32 of the upper block 16 to the corresponding face 34 of the lower block 18.

In use, the support 10 operates mainly in traction in the vertical direction, because of the force exerted by the mass of the suspended structure (the exhaust pipe). The arms 22,24,26 are subjected to both tension and deflectional forces, the latter arising where the ends of the arms are "hinged" to the upper and lower blocks 16,18. The flexibility of the arms thus permits a certain degree of vertical up and down movement, and the rubber material thus helps to isolate vibration of the exhaust system from the vehicle body and also provides good damping characteristics.

Figure 2:
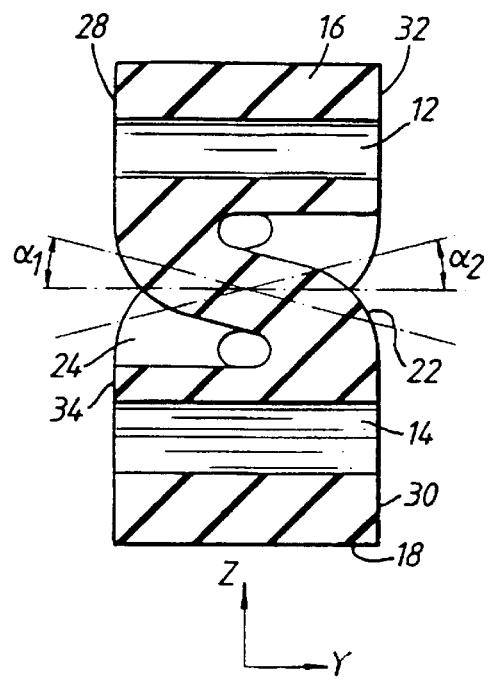

The exhaust system may also be subjected to forces tending to move it sideways, such forces of course being transmitted to the support 10 and thus tending to move the lower block 18 along the y axis shown in FIG. 2 relative to the upper block 16. It is important that the support 10 provides significant resistance to such movement in order to prevent the exhaust system coming into contact with an adjacent rigid part of the vehicle body and thus causing unpleasant "knocking", as well as possible damage. If such movement takes place in the $Y^+$ direction, that is, in the direction of the y axis shown in FIG. 2, the inner arm 22 will be subjected mainly to tension forces, whereas the outer arms 24 and 26 will be subjected to a combination of compression and bending. If the movement takes place in the opposite direction, $Y^-$, the outer arms 24,26 are subjected mainly to tension while the inner arm 22 is subjected to a combination of compression and bending. In each case (that is, in either direction $Y^+$ and $Y^-$), the arms 22,24 and 26 provide high resistance to the sideways movement and thus help to resist knocking. The support thus has a relatively low value of $K_z/K_y$, where $K_z$ is the rigidity in the vertical direction and $K_y$ is the rigidity in the transverse or y direction ($Y^+$ or $Y^-$). A value of $K_z/K_y$ close to 1 can be achieved, in contrast to more usual values of the order of 2.

In the support 10, the value of $K_z/K_y$ is affected by the values for the angles $alpha_1$ and $alpha_2$ shown in FIG. 2. The angle $alpha_1$ is the angle between the horizontal and the median direction of the central arm 22. The angle $alpha_2$ is the angle between the horizontal and the median direction of the outer arm 24 (or the other outer arm 26). The closer $alpha_1$ and $alpha_2$ are to 90°, the greater, and the less satisfactory, will be the value of the ratio $K_z/K_y$; the support will become closer in construction and function to known forms of support which work in pure tension in the Z direction and mainly in shear in the y direction. Conversely, the smaller the value of $alpha_1$ and $alpha_2$, the lower will be the value of the ratio $K_z/K_y$.

The damping characteristics of the support are affected by the following factors (among others):

(a) The hardness and nature of the elastomeric material used for the support;

(b) The cross-section of the arms 22,24 and 26 (which can in principle be of any shape); and (c) the manner in which the ends of the arms are connected to the upper and lower blocks 16 and 18.

Figure 3:
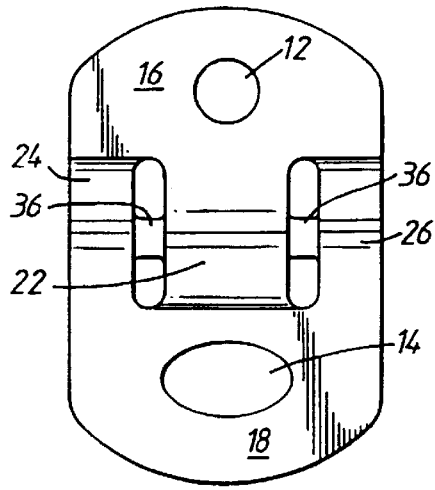
FIG. 3 is a front view of the resilient support of FIG. 1 but showing modification.

As shown in FIG. 3, elastomeric connections 36 may be integrally moulded between the inner arm 22 and the outer arms 24,26.

Figure 4:
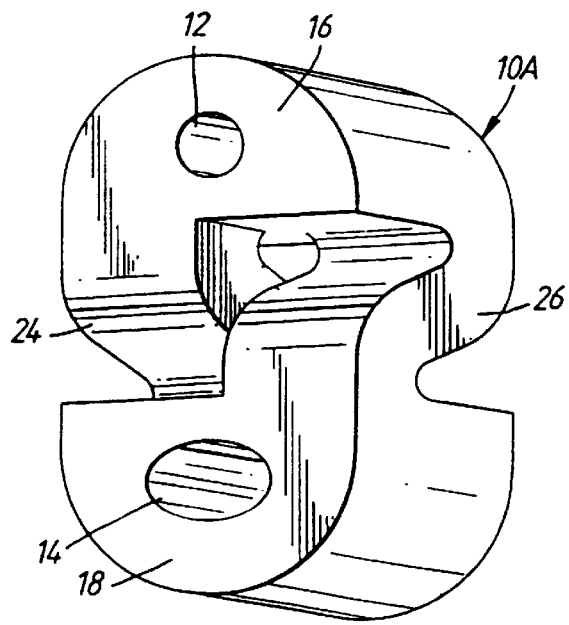
FIG. 4 is a perspective view corresponding to FIG. 1 but showing another one of the resilient supports.

FIG. 4 shows a modified form 10A of the support of FIG. 1. In the support 10A, parts corresponding to those in FIG.

1 are correspondingly referenced. It will be apparent that the support 10A differs from the support 10 in that the support 10A does not have an inner arm 22 but only two outer arms 24 and 26, and these are directed in opposite directions. The operation of the support 10A is generally similar to that of the support 10. It is normally advantageous to have an odd number of arms (as in the support 10) because this gives the support a plane of symmetry YZ.

Figure 5:
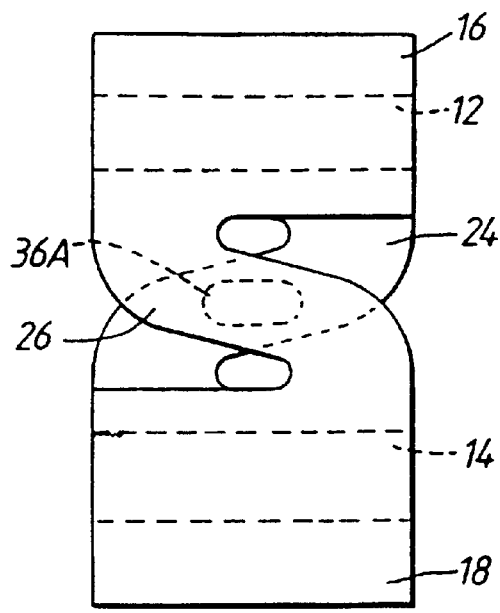
FIG. 5 is a side view of the resilient support of FIG. 4.
Figure 6:
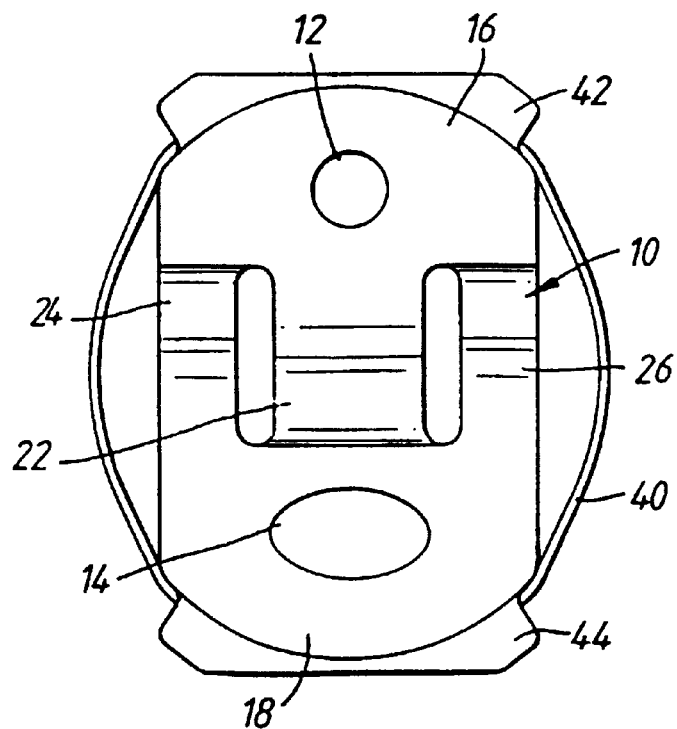
FIG. 6 is a view corresponding to FIG. 3 but showing a further modification.

The two outer arms 24,26 of the support 10A can be interconnected by an integrally moulded connection 36A as shown dotted in FIG. 5.

It may be desirable to limit the maximum possible extension of the supports in the Z direction. This can be achieved by means of a flexible but inextensible belt 40 which extends around the outside surfaces of the blocks 16 and 18 and is located in grooves in integrally moulded shoulders 42 and 44.

What is claimed is:

1. A resilient support for resiliently supporting a vibratable member from a relatively rigid structure, comprising a first end part having a front face and a rear face and being adapted for connection to the structure, a second end part having a front face and a rear face and being adapted for connection to the vibratable member, the second end part being spaced from the first end part in a first direction relative to the first end part, and arm means resiliently connecting the first and second end parts together for movement of the first and second end parts away from and toward each other in the first direction and in a second direction diametrically opposed to the first direction in response to a vibration of the member relative to the structure, the arm means comprising first, second and third arms made of resilient material, each one of the arms being connected to the first and second end parts for resiliently resisting the vibration, the first and second end parts facing in opposite directions, the first and second arms being resiliently connected to the end parts and extending between one of the faces of the first end part and the corresponding face of the second end part in a third direction diagonal to the first and second directions, the third arm being positioned between the first and second arms and extending in a fourth direction diagonally opposite to the third direction, the arrangement being such that movement of the first and second end parts away from and towards one another in the first and second directions is resisted by tension and compression in the arms and by bending where the arms are resiliently connected to the end parts and such that movement of the second end part relative to the first end part in directions transverse to the first and second directions is resisted in one of those transverse directions substantially by tension in the first and second arms and in the other one of the transverse directions by a combination of compression in and bending in the first and second arms.

2. A support according to claim 1, including a resilient interconnection between adjacent arms where their diagonal directions cross over.

3. A support according to claim 1, in which the first and second end parts and the arm means are integrally made of elastomeric material.

4. A support according to claim 3, which is molded.

5. A support according to claim 4, which is molded from elastomeric material.

6. A resilient support for resiliently supporting a vibratable member from a relatively rigid structure, comprising a first end part having a front face and a rear face and being adapted for connection to the structure, a second end part having a front face and a rear face and being adapted for connection to the vibratable member, the second end part being spaced from the first end part in a first direction relative to the first end part, arm means resiliently connecting the first and second end parts together for movement of the first and second end parts away from and toward each other in the first direction and in a second direction diametrically opposed to the first direction in response to a vibration of the member relative to the structure, the arm means comprising at least a first arm made of resilient material connected to the first and second end parts for resiliently resisting the vibration, the first and second end parts facing in opposite directions and the first ann being resiliently connected to the end parts and extending between corresponding faces of the end parts in a third direction diagonal to the first and second directions whereby movement of the first and second end parts away from and towards one another in the first and second directions is resisted by tension and compression in the arm and by bending where the arm is resiliently connected to the end parts and whereby movement of the second end part relative to the first end part in directions transverse to the first and second directions is resisted in one of those transverse directions substantially by tension in the arm and in the other one of the transverse directions by a combination of compression in the arm and bending therein, the support including limiting belt means for limiting the extent to which the two end parts can move apart from each other in response to the vibration.

* * * * *